J. DANNER.

REVOLVING BOOK-CASE.

No. 7,523.

Reissued Feb. 20, 1877.

Witnesses:

W. B. Masson

D. P. Cowl

Inventor:

John Danner

By E. E. Masson atty

N. PETERS, PHOTO-LITHOGRAPHER, WASHINGTON, D. C.

UNITED STATES PATENT OFFICE.

JOHN DANNER, OF CANTON, OHIO.

IMPROVEMENT IN REVOLVING BOOK-CASES.

Specification forming part of Letters Patent No. 177,479, dated May 16, 1876; reissue No. 7,523, dated February 20, 1877; application filed January 31, 1877.

*To all whom it may concern:*

Be it known that I, JOHN DANNER, of Canton, in the county of Stark and State of Ohio, have invented certain new and useful Improvements in Revolving Book-Cases; and that the following is a full, clear, and exact description of the construction and operation of the same, reference being had to the accompanying drawings, making a part of this specification, in which—

Figure 1:
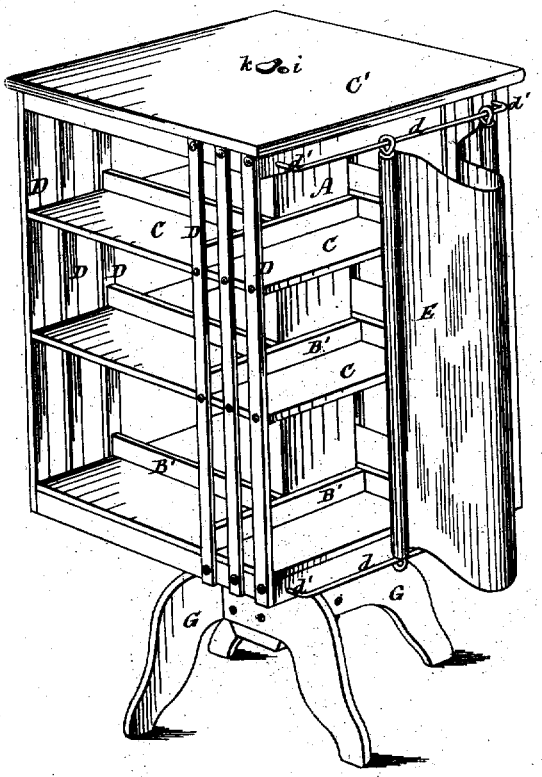
Figure 2:
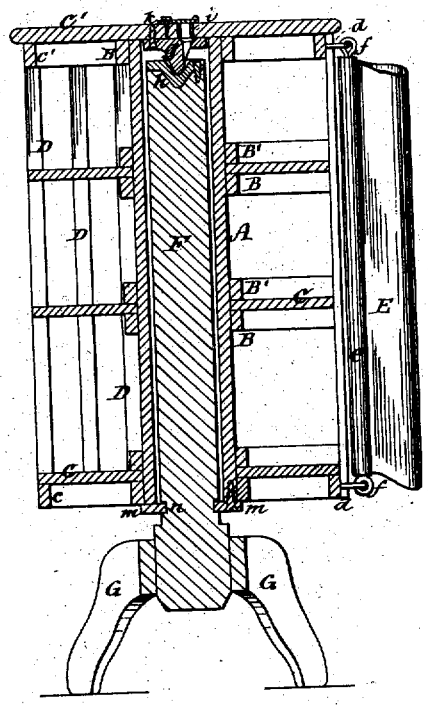
Figure 3:
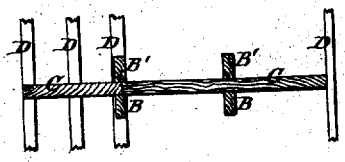
Figure 4:
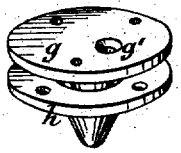

Figure 1 represents, in perspective, one of my improved revolving book-cases. Fig. 2 represents a vertical central section through the same. Fig. 3 represents a vertical section through two contiguous shelves of one of the series, showing the manner in which they are supported and have their joints covered. Fig. 4 represents, in perspective, the conical spindle and its bearing employed to support the book-case and keep the frictional parts lubricated.

Similar letters of reference, where they occur, denote like parts in all the figures.

I am aware that revolving book-cases have been made to rotate around a spindle located within its frame; but the difficulty has been to reduce the friction and noise produced, under the pressure or weight of the books, by the contact of the movable and stationary parts. For this purpose friction-rollers have been used upon the frictional parts; but often they only increase the noise, and when lubricants are used they cannot be renewed without taking the framing to pieces, or if an oil-hole is located so as to reach the bearing parts, it must be located where the books are likely to be injured by the oil.

The object of my invention is to produce a revolving book-case that by its construction will render the use of friction-rollers unnecessary. It being suspended from the top of a central post extending to the top shelf of the book-case, it possesses a degree of stability that could not be obtained by any other mode of construction; and my invention relates to the combination, with the said suspended book-case and its central post, of a perforated pendent spindle attached to the upper part of the book-case, and a conical oil-cup bearing attached to the upper extremity of the post, and an oil-duct, by means of which the frictional parts can easily be kept lubricated without danger to the books.

My invention further relates to the mode of constructing and supporting the outer end of each shelf from the top shelf of a revolving book-case by means of vertical strips that will also keep books from falling off, and said strips being arranged in connection with horizontal bars, so that all the joints are covered by the supports; and hygrometric changes will not affect the complete finish of the book-case, which may also be provided with curtains attached to vertical rods suspended from horizontal guide-rods.

To enable others skilled in the art to make and use my invention, I will proceed to describe the same with reference to the drawings.

A represents a vertical quadrangular hollow frame, to which are attached the horizontal bars B, that support the inner end of the shelves C of the book-case, while the outer end is supported by vertical strips D, suspended from the continuous four-sided platform or top shelf $c'$. As all the boards that form this top shelf can extend across the horizontal bars B, it can be made of any desired strength. However, it is provided with a rim, $c'$, on its under side, to add to its strength and keep the top shelf from warping. The lower series of shelves are also provided with a rim, $c$, to add to their strength, and to improve the appearance of the book-case, the rims $c$ and $c'$ presenting more surface to fasten the connecting vertical strips D to the top and bottom shelves. To the rims $c$ and $c'$ are attached the horizontal rods $d$, supporting the curtain E, that may be used to inclose the book-case, if desired. This curtain is preferably fastened to vertical rods $e$, having screw-rings $f$ at each of their extremities resting upon the rods $d$. The rods $d$ are bent at a right angle at $d'$, where they form a rest for the screw-rings $f$, and retain the curtain E in a stretched position. To the under side of the solid platform or top shelf C′ is attached a pendent conical spindle, $g$, that rests in an oil-cup bearing, $h$, attached to the top of a cylindrical post, F, that is kept in a vertical position by legs G, attached to it near its lower extremity. These legs can be made either of wood or metal, and can also be provided with caster-wheels, each leg being preferably secured independently to the central post, so that if one of them should accidentally be broken it can be replaced at little cost. The pendent spindle *g* is provided with an opening, *g'*, to receive oil for the bearing. A duct, *i*, is located over it in the top shelf C', and a cap or cover, *k*, is placed over the duct *i* to exclude the dust. The intermediate series of shelves (of which there may be as many as desired) between the top and bottom shelves are supported at their inner ends by the transverse bars B, and at their outer ends by the vertical strips D, that also retain the books in their places upon the shelves, and keep them from falling off. To strengthen the book-case, and to give it a better finish, and also to form a stop for the books, I attach to the prism A, and resting on the shelves, a series of horizontal bars, B', that cover all the joints in the shelves, and preserve the binding of the books from injury against the sharp edges of the joints. The revolving book-case is connected to the central post F by means of the collar *m*, formed of two pieces, that embrace the post in an annular groove, *n*.

It is evident that a very convenient wardrobe can be constructed in the same manner as above described by simply omitting the intermediate shelves between the top and bottom of the revolving case, and the curtain E, surrounding it, will form all the covering required. If the book-case is made low, with only a couple of shelves, it will be found very convenient as a table for a study, and it can then be finished with a marble top or otherwise.

Having now described my invention, what I claim is—

1. In combination with a revolving book-case, suspended from the top of a stationary post having an oil-cup bearing, *h*, the pendent spindle *g*, attached to the top shelf of the frame, and oil-duct *i*, constructed substantially as and for the purpose described.

2. In combination with a revolving book-case, suspended from the top of a stationary post, F, the series of vertical strips D, located adjacent to the corners of the book-case, to support the outer end of the shelves and keep books from falling off, substantially as described.

3. In combination with a revolving book-case, suspended from the top of a stationary post, the series of horizontal bars B', to cover the joints and strengthen the case, substantially as shown and described.

4. The quadrangular platform or solid upper shelf C' of a revolving book-case, in combination with a vertical quadrangular hollow frame, A, and vertical strips D, to support a series of shelves from the top of a central post, substantially as and for the purpose described.

JOHN DANNER.

Witnesses:

GEO. W. RAFF,

C. B. CAMPBELL.